United States Patent [19]
Olsson

[11] Patent Number: 4,929,875
[45] Date of Patent: May 29, 1990

[54] METHOD TO CONTROL STOPS OF AN INTERMITTENTLY OPERATING DRIVING MOTOR

[75] Inventor: Staffan Olsson, Stockholm, Sweden

[73] Assignee: Flyct AB, Solna, Sweden

[21] Appl. No.: 372,988

[22] Filed: Jun. 28, 1989

Related U.S. Application Data

[63] Continuation-in-part of Ser. No. 316,276, Feb. 27, 1989.

[30] Foreign Application Priority Data

Mar. 4, 1988 [SE] Sweden .............................. 8800772

[51] Int. Cl.$^5$ .............................................. H02P 3/18
[52] U.S. Cl. .................................. 318/362; 318/430; 318/434
[58] Field of Search ............... 318/362, 364, 365, 366, 318/430, 431, 434, 453; 361/23, 31

[56] References Cited

U.S. PATENT DOCUMENTS

| | | | |
|---|---|---|---|
| 4,628,234 | 12/1986 | Mizuta et al. | 318/264 X |
| 4,641,067 | 2/1987 | Iizawa et al. | 318/286 X |

FOREIGN PATENT DOCUMENTS

| | | | |
|---|---|---|---|
| 2820330 | 11/1979 | Fed. Rep. of Germany | 318/283 |
| 57-160394 | 10/1982 | Japan | 361/31 |
| 59-59087 | 4/1984 | Japan | 318/283 |

*Primary Examiner*—Bentsu Ro
*Attorney, Agent, or Firm*—Menotti J. Lombardi

[57] ABSTRACT

The invention concerns a method to control the stops of an intermittently operating electric motor. The motor current is measured at even intervals and a mean value is created from the measured values. An actual value is compared with said mean value and a signal is given to stop the motor if the actual value deviates from the mean value a predetermined amount. Each new measured value replaces the first measured value in the series.

2 Claims, 2 Drawing Sheets

METHOD TO CONTROL STOPS OF AN INTERMITTENTLY OPERATING DRIVING MOTOR

CROSS REFERENCE TO RELATED APPLICATION

This application is a continuation-in-part of application Ser. No. 316,276, filed Feb. 27, 1989, now abandoned.

BACKGROUND OF THE INVENTION

The invention concerns a method to control stops of an intermittently operating electric motor, such as a driving motor for a pump or a mixer, the stop being dependent of the current consumption of the motor.

When using pumps it is important for several reasons to avoid unnecessary dry running of the pump because it causes increased wear, additional current consumption, etc.

Different types of stopping methods and devices are known. The most common being to sense the pump head which means that the pump is stopped at a certain minimum level. A disadvantage with this solution is that the pump head level indicator is often sensitive to mechanical and chemical influences which presents a risk of significant errors.

One way to detect a dry running pump without any level indicator is to analyze the motor current and sense its decrease which occurs when the pump starts to run dry. This can be obtained by comparing the value of actual current level with a fixed level or by detecting a change in the current.

Turning the motor off at a certain current level can of course be accomplished by connection of a current sensitive relay. However, such a device is only a good solution during stable conditions and when the pumping fluid is relatively clean. At changing operating conditions such as when the pump is moving or where abrasive fluids are being pumped, the level of current consumption changes relatively quick causing the relay to release at the wrong time. The improper triggering of the relay can also be a source of error.

Stopping of the motor depending on the change of the current has also certain disadvantages. At pump start up, the stop function must be by-passed for a certain period (blank time), otherwise a stop would take place immediately. But, this also means that a stop would not occur if the pump runs dry at start up because a current decrease had already taken place before the end of the blank time period.

The disadvantages mentioned about are eliminated by the invention hereinafter described.

SUMMARY OF THE INVENTION

An object of the invention is to provide an improved method to control stopping of an intermittently operating drive motor.

Another object of the invention is to provide an improved method of controlling the stops of an intermittently operating pump motor dependent upon current consumption.

According to the broader aspects of the invention, motor current is measured at even intervals and a mean value is created from the measured values. An actual value is then compared with the mean value and a signal to stop the motor is given if the actual valve deviate from the mean value by a predetermined amount.

BRIEF DESCRIPTION OF THE DRAWINGS

Other objects and features of the invention will best be understood if reference is made to the following detailed description of the preferred embodiment in conjunction with the accompanying drawings, in which.

DETAILED DESCRIPTION OF THE PREFERRED EMBODIMENT

According to the invention, the current consumption of the electric motor is measured at even intervals and each value is compared with a running mean value of a number of previously measured values. If there is a deviation between actual value and the mean value which is more than a predetermined amount, the motor is stopped.

The advantage of this method as compared with the previously known method to compare actual value with a fixed value is, that the device has an updated value point or comparison with regard to driving conditions. A continuous, slow, change of the current values, for instance depending on wear of the hydraulic parts of the pump, does not cause the pump to stop. This would occur, however, if a constant current level were used as a value of comparison. The fact that the mean value is always up dated, avoids false stops.

The invention may be practised in a device where signals measured by a current transformer are stored and analyzed in a microprocessor. The measured signals are randomly sampled after a blank time during which the current value of the motor is stabilized. Random samples are then taken at even intervals. Each value is compared with a running mean value of previously sampled and stored values. After a certain number of values have been read, each new value will replace the first value in the series. At a predetermined deviation from the mean value, the pump is stopped.

In the initial start up stage, the first read value will be the mean value. Not until a determined number of values has been sampled and stored, will every new value replace the first one in the series as described above. Normally the mean value will then be established by one value from each pump cycle, i.e., the last sample before the one that has lead to a stop. Another alternative would be for several current values from each pump cycle to be used to establish the mean value.

Figure 1:
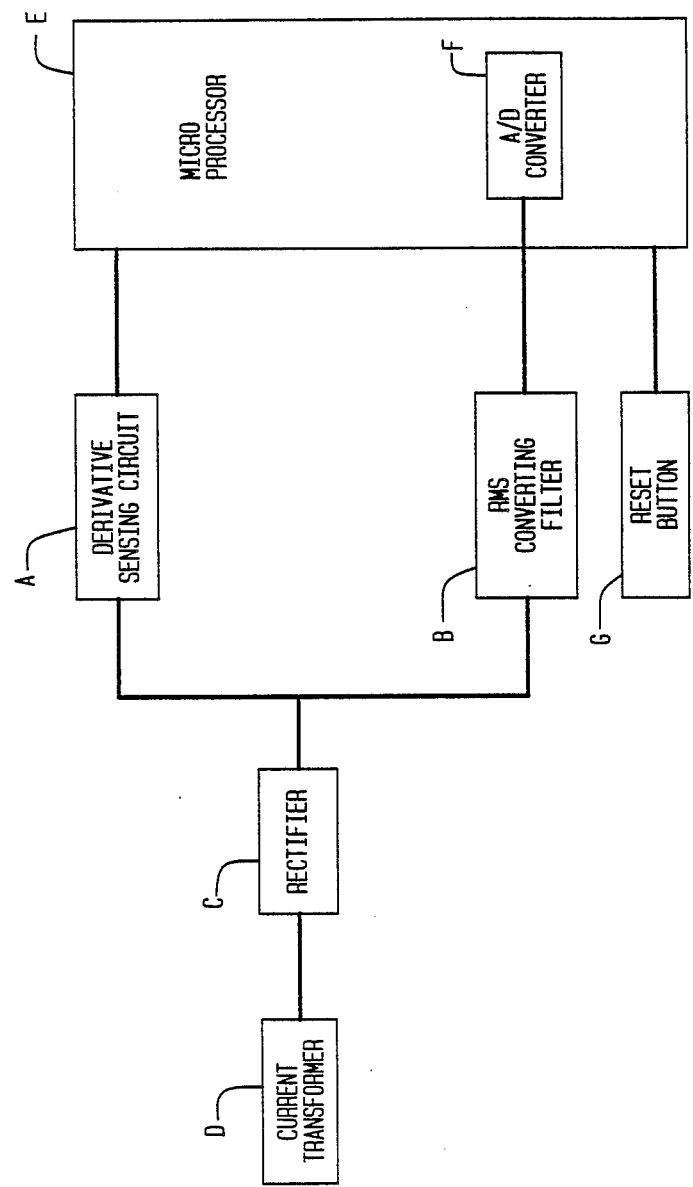
FIG. 1 shows a block diagram in accordance with the invention.
Figure 2:
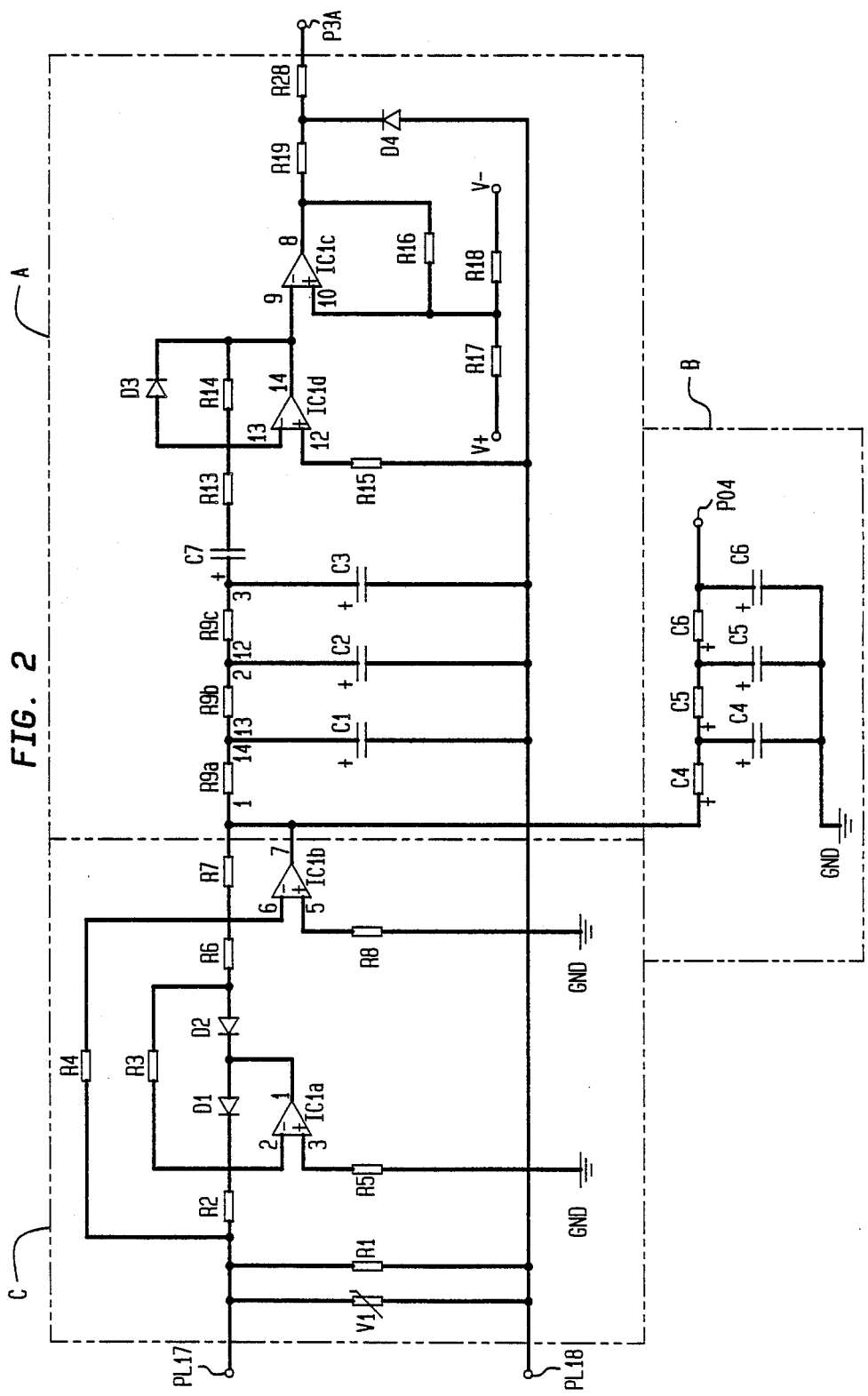
FIG. 2 shows a circuit diagram for implementing the rectifier, derivative sensing, and RMS converting filter circuits of FIG. 1 in accordance with the invention.

Referring now to the drawings, FIG. 1 shows the block diagram with one derivative value and one absolute value sensing means for practicing the invention, and FIG. 2 shows an implementing circuit diagram therefor. In the FIGS., there is shown a derivative value sensing means A, an absolute value sensing means B, and a rectifier C.

A current signal is coupled from a current transformer D through which one of the phase conductors of, for example, a three phase pump motor is connected. The motor current signal is coupled to rectifier C, rectified in a first step and then coupled to the derivative sensing circuit A and RMS converting circuit B. The derivative value sending circuit A generates a derivative signal representative of the actual value to the microprocessor E, and if the amplitude of the signal has a sufficiently large negative derivative value, the processor will detect this derivative signal as a condition representing that the pump is pulling in air. The processor then generates a stop signal to stop the motor. This type circuit arrangement for stopping is previously known.

In the improved arrangement, RMS converting filter circuit B utilizes the same current signal as the circuit A, but converts it into a RMS voltage signal, which is an effective mean value. This RMS voltage signal is coupled to an A/D converter F within the processor which converts this signal into digital form, for digital processing within the processor.

When a current value that is to be a part of the mean value is sampled, the pump current must be stable. Accordingly in the preferred embodiment, current values 3 seconds ahead and 3 seconds after sampling must not deviate more than 5 percent. The first current value which is sampled is then the current value obtained 6 seconds or more from the current value that has caused the previous stop. If this current value is not stable enough, earlier current values are sampled.

At the initial start up, a current value stored in an EEPROM (electrically, erasable, programmable ROM) is used as a reference current value (mean value). This reference mean value is stored in the memory four times and represents the mean value. Said stored mean values are then phased out, one in each pump cycle, and are all replaced after five pumping cycles.

The EEPROM current mean value serves as a default value and also as the initiator if there is an extended supply voltage failure. The default value can be updated by a reset function button G connected to the processor to make it possible to manually create a default value for a specific application or condition.

In the circuit diagram shown in FIG. 2 the input current signal from the transformer D is coupled to input points PL 17 and PL 18. The rectifier C includes operational amplifiers IC1a and IC1b. The circuit C provides full wave rectifying and amplifying of the current signal from the current transformer D.

The RMS converting circuit B comprises a three stage low pass filter which equalizes the rectified signal and generates the mean current value. The A/D convertor F converts the mean current value signal to a digital signal for storage in the processor.

Derivative sensing circuit A also includes a three stage low pass filter section followed by an operational amplifier IC1d, where the derivate actual value signal is generated. A drop in voltage at the input IC1d causes an increase of the voltage at its output 14. The amplifier IC1c and R16, R18 constitute a comparator with a normally high output voltage. If the voltage at its negative input exceeds the reference mean value at its positive input created by the divider R 17, R 18, the output voltage is driven negative by positive feedback. This actual value negative signal is coupled to the processor which detects the signal which if it exceeds the mean current value by a predetermined amount, the processor determines the condition that the pump is beginning to pull-in air and generates the signal to stop the motor.

According to the invention a method has been obtained which in a simple and effective way controls the stops of the electric motor in an intermittently operating pump or another machine. The invention secures a correct control which is entirely independent of the surroundings and gradual changes of operating conditions.

I claim:

1. A method to control stopping of an electric motor for a pump, the stopping being dependent upon the current consumption of the motor, comprising the steps of:

coupling a current signal from one phase of said motor to a transformer, and connecting said current signal from the output of the transformer to a rectifier;

rectifying said current signal and coupling said rectified signal to a derivative sensing circuit and an RMS converting filter circuit;

generating a derivative signal representing an actual current consumption value in said derivating sensing circuit and coupling said derivative signal to a microprocessor;

producing a mean current value in said RMS circuit and coupling said mean current value to said microprocessor, said microprocessor having previous predetermined stored mean values;

comparing in said microprocessor the actual current consumption value with a stored mean value of the nearest previous predetermined stored mean values; and stopping the motor when a predetermined difference is detected between the actual current consumption value and the stored mean value of the nearest previous predetermined stored mean values.

2. A method to control stopping of an intermittently operating electric motor for a pump by detecting the current consumption in one phase of the winding of the electrical motor, comprising the steps of:

coupling a current signal from said one phase to a transformer;

receiving said current signal from the transformer in a rectifying circuit, and rectifying said current signal;

simultaneously coupling said rectified current signal to a derivative sensing circuit and an RMS converting filter circuit;

generating in said derivative sensing circuit a derivative sensing signal having a large negative derivative value when the pump begins to pull in air, and coupling said derivative sensing signal to a microprocessor;

producing a mean current value in said RMS circuit and coupling said mean current value to an A/D converter in said microprocessor;

comparing in said microprocessor said derivative sensing signal representing the actual current value with said mean current value from said converter; and initiating a stopping signal in said microprocessor to stop the motor when a predetermined difference between said actual current value and said mean current value is detected by said microprocessor.

* * * * *